US010798293B2

(12) United States Patent
Sudo

(10) Patent No.: US 10,798,293 B2
(45) Date of Patent: Oct. 6, 2020

(54) IMAGE PICKUP APPARATUS AND IMAGE PICKUP METHOD

(71) Applicant: OLYMPUS CORPORATION, Hachioji-shi, Tokyo (JP)

(72) Inventor: Yusuke Sudo, Chofu (JP)

(73) Assignee: OLYMPUS CORPORATION, Tokyo (JP)

(*) Notice: Subject to any disclaimer, the term of this patent is extended or adjusted under 35 U.S.C. 154(b) by 79 days.

(21) Appl. No.: 16/163,113

(22) Filed: Oct. 17, 2018

(65) Prior Publication Data

US 2019/0260924 A1 Aug. 22, 2019

(30) Foreign Application Priority Data

Feb. 21, 2018 (JP) .................................. 2018-028616

(51) Int. Cl.
*H04N 5/232* (2006.01)
*G02B 7/36* (2006.01)
*G03B 13/36* (2006.01)

(52) U.S. Cl.
CPC ........... *H04N 5/23218* (2018.08); *G02B 7/36* (2013.01); *G03B 13/36* (2013.01); *H04N 5/23212* (2013.01); *H04N 5/23222* (2013.01)

(58) Field of Classification Search
CPC ........... H04N 5/23218; H04N 5/23222; H04N 5/23212; H04N 5/232; H04N 5/23245; H04N 5/232935; G03B 13/36; G02B 7/36
See application file for complete search history.

(56) References Cited

U.S. PATENT DOCUMENTS

| | | | | |
|---|---|---|---|---|
| 2013/0262565 A1* | 10/2013 | Nakamura | .............. | H04L 67/42 709/203 |
| 2013/0293586 A1* | 11/2013 | Kaino | ..................... | G06F 3/005 345/633 |
| 2015/0278224 A1* | 10/2015 | Jaber | ................... | G06F 16/5854 707/749 |
| 2016/0284095 A1* | 9/2016 | Chalom | ............. | H04N 5/23229 |
| 2017/0310888 A1* | 10/2017 | Wright | .................... | H04N 5/772 |
| 2019/0005356 A1* | 1/2019 | Tsunoda | ................. | G06K 9/628 |
| 2019/0171897 A1* | 6/2019 | Merai | ................ | H04N 5/23296 |
| 2019/0273857 A1* | 9/2019 | Hirata | ...................... | G06T 5/008 |
| 2019/0279017 A1* | 9/2019 | Graham | ................. | G06N 20/00 |

(Continued)

FOREIGN PATENT DOCUMENTS

JP 2006-227133 A 8/2006

*Primary Examiner* — Shahbaz Nazrul
(74) *Attorney, Agent, or Firm* — Volpe and Koenig, P.C.

(57) ABSTRACT

An image pickup apparatus of the present invention includes: an image pickup unit that picks up an image of a specific range and acquires an image signal; a storage unit that stores multiple target image dictionaries respectively corresponding to multiple types of targets; an inference engine that determines a type of the specific target on the basis of an image signal acquired by the image pickup unit and the multiple target image dictionaries stored in the storage unit, and selects one of the target image dictionaries corresponding to the determined type of the specific target from the multiple target image dictionaries; and an image pickup control unit that performs image pickup control on the basis of the image signal acquired by the image pickup unit and the target image dictionary selected by the inference engine.

7 Claims, 8 Drawing Sheets

(56) References Cited

U.S. PATENT DOCUMENTS

| | | | |
|---|---|---|---|
| 2019/0320116 A1* | 10/2019 | Nabetani | H04N 5/23229 |
| 2019/0379837 A1* | 12/2019 | Kim | H04N 9/735 |
| 2020/0021733 A1* | 1/2020 | Liu | G06K 9/6273 |
| 2020/0050898 A1* | 2/2020 | Keen | H04N 5/23218 |
| 2020/0051260 A1* | 2/2020 | Shen | G06T 7/44 |

* cited by examiner

IMAGE PICKUP APPARATUS AND IMAGE PICKUP METHOD

CROSS REFERENCE TO RELATED APPLICATION

This application claims the benefit of Japanese Application No. 2018-028616 filed in Japan on Feb. 21, 2018, the contents of which are incorporated herein by this reference.

BACKGROUND OF THE INVENTION

1. Field of the Invention

The invention relates to an image pickup apparatus that acquires an image signal of a predetermined range including a specific target, and an image pickup method.

2. Description of Related Art

Heretofore, a commercially practical and widely known image pickup apparatus referred to as a digital camera or a video camera, for example, has been configured to include an image display device such as an LCD (liquid crystal display) device and an OEL (organic electro-luminescence) display device. The image display device photoelectrically converts optical images formed by an image pickup optical system in sequence, by use of a photoelectric conversion element or the like (hereinafter referred to as image pickup device) such as a CCD (charge coupled device) image sensor and a CMOS (complementary metal oxide semiconductor) image sensor, records an image signal thus acquired in a storage medium as image data (e.g., digital image data indicating a still picture or a movie) of a predetermined form, and displays a still picture or a movie on the basis of the digital image data.

When the conventional image pickup apparatus is used to acquire an image signal of a predetermined range including a desired specific object, the user needs to be well-experienced to quickly and surely determine various types of settings (so-called image pickup parameter settings) including the setting of an appropriate exposure value that matches the surrounding environment in which the image pickup operation is to be performed, an accurate focusing setting, and an ideal composition setting.

Recently, increase in the processing speed of a control circuit provided inside an image pickup apparatus, and enlargement in the capacity of an auxiliary storage medium such as a flash memory for storing various types of control programs have been achieved. For this reason, recent image pickup apparatuses are usually capable of automatically determining various types of settings (image pickup parameter settings such as exposure setting and focusing) at the time of performing an image pickup operation, depending on the settings of the image pickup apparatus and the surrounding environment.

For example, Japanese Patent Application Laid-Open Publication No. 2006-227133 discloses a conventional image pickup apparatus in which a focusing operation is automatically optimized by switching a focus scanning range for performing an automatic focusing operation, depending on settings and the surrounding environment of the image pickup apparatus.

More specifically, in the image pickup apparatus disclosed in Japanese Patent Application Laid-Open Publication No. 2006-227133 and other documents, first, table information is prepared beforehand, the table information containing lens positions of a zoom lens and focus position information corresponding to the prioritized focus type.

In such an image pickup apparatus, when a shutter button is pressed all the way down, or is pressed all the way down before a predetermined time period has elapsed after pressing halfway down, a lens position of the zoom lens is acquired, and processing of determining whether to select near view priority focus or distant view priority focus is performed.

The determination processing in this case is performed based on the state (e.g., whether or not a flash is used, and whether or not the aperture value is open) of the image pickup apparatus and the state (e.g., illuminance, the state (whether there is flicker) of lighting, and whether it is outdoors or indoors) of the environment in which the image is picked up.

Then, a focus position is acquired from the table information, on the basis of the acquired lens position information of the zoom lens and the result of determination on whether near view priority focus or distant view priority focus is selected, and contrast AF processing is performed within the acquired focus position range.

SUMMARY OF THE INVENTION

An image pickup apparatus of an aspect of the present invention includes: an image pickup unit that picks up an image of a specific range and acquires an image signal; a storage unit that stores multiple target image dictionaries respectively corresponding to multiple types of targets; an inference engine that determines a type of a specific target on the basis of the image signal acquired by the image pickup unit and the multiple target image dictionaries stored in the storage unit, and selects one of the target image dictionaries corresponding to the determined type of the specific target from the multiple target image dictionaries; and an image pickup control unit that performs image pickup control on the basis of the image signal acquired by the image pickup unit and the target image dictionary selected by the inference engine.

An image pickup method of an aspect of the present invention includes steps of: picking up an image of a specific range and acquiring an image signal; determining a type of a specific target on the basis of the image signal and multiple target image dictionaries respectively corresponding to multiple types of targets; selecting one of the target image dictionaries corresponding to the determined type of the specific target; setting an image pickup parameter for appropriately picking up an image of a picture signal indicating a specific target included in the image signal, on the basis of the image signal and the target image dictionary selected from among the multiple target image dictionaries; and outputting a shutter release signal at a predetermined timing to start an image pickup operation.

Benefits of the invention will be apparent from the following detailed description.

DETAILED DESCRIPTION OF THE PREFERRED EMBODIMENTS

Figure 1:
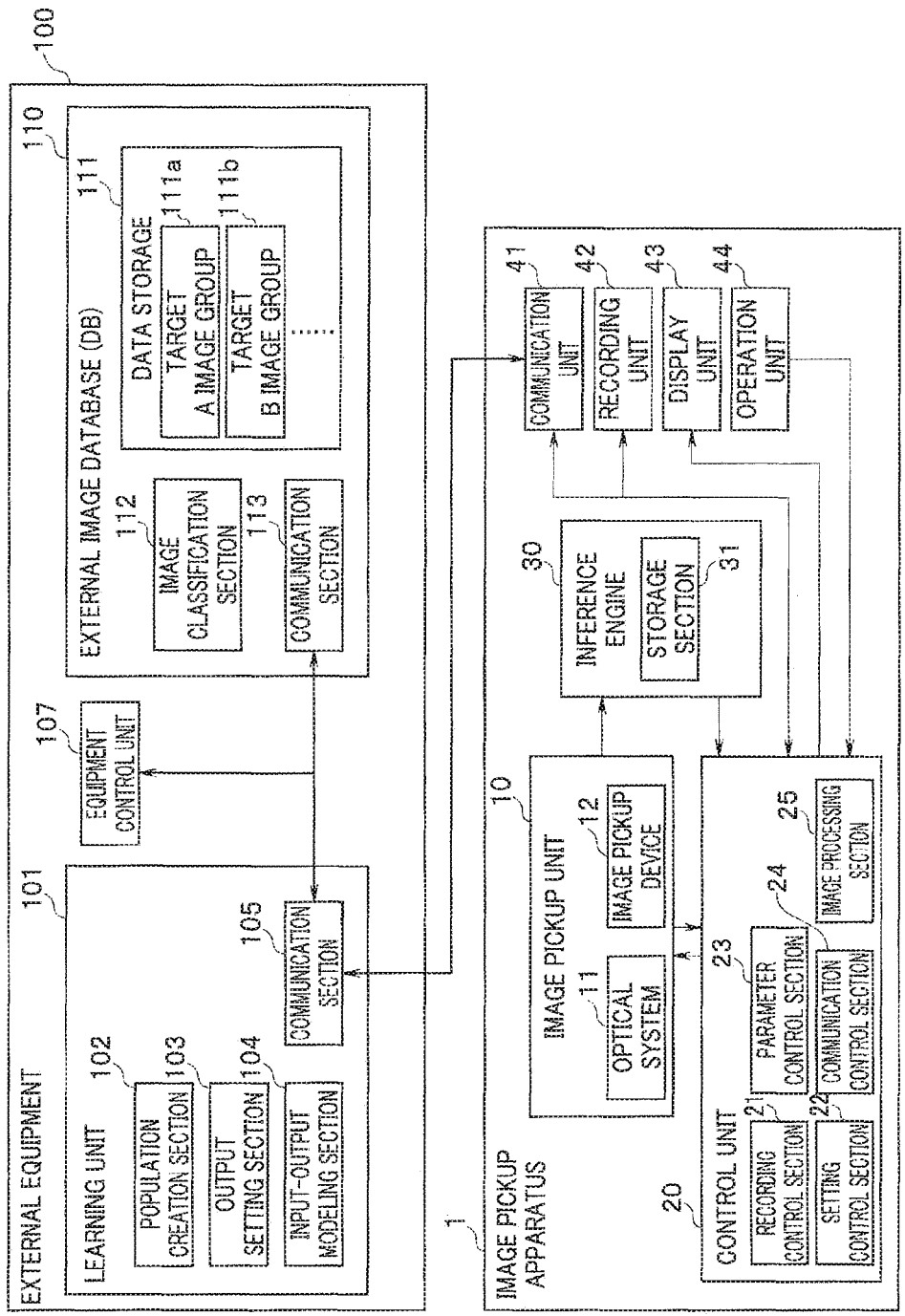
FIG. 1 is a block configuration diagram showing a schematic configuration of an image pickup apparatus of an embodiment of the present invention, and external equipment that communicates with the image pickup apparatus.

Hereinafter, the present invention will be described by using the embodiment shown in the drawings.

The drawings used in the following description are schematic, and dimensional relationships among members, scales, and the like may differ depending on the component, in order to show the component in a sufficiently large size to be recognized in the drawing. Accordingly, in terms of the number of each component, the shape of each component, the size ratio among components, and relative positional relationships of the components, the present invention is not limited to the forms shown in the drawings.

While it is widely known to use an AI to recognize a target in a picked up image or an image obtained in other ways, such image detection using an AI includes various types ranging from a large-scale type to a compact type installed in a mobile terminal as in the present application.

Since such compact-type inference engines are required to show high performance with less layers and small power consumption, learning is difficult. Hence, considering the various limitations, such compact-type configurations are considered to have maximum effect.

A user of an image pickup apparatus picks up an image of various targets depending on the occasion or his/her preferences. In a situation where the image pickup target is frequently switched, a structure as in the present application is vital for causing a compact-type inference engine to exert its maximum effect.

Embodiment

An embodiment of the present invention exemplifies an image pickup apparatus configured to photoelectrically convert an optical image formed by an optical lens, for example, by use of a solid-state image sensor, records the resultant image signal as digital data indicating a still picture or a movie in a storage medium, and is capable of reproducing and displaying the still picture or movie based on the digital image data recorded in the storage medium.

First, a configuration of the image pickup apparatus of the embodiment of the present invention will be described with reference to FIG. 1. FIG. 1 is a block configuration diagram showing a schematic configuration of the image pickup apparatus of the embodiment of the present invention and external equipment that communicates with the image pickup apparatus.

An image pickup apparatus 1 of the embodiment is an apparatus for acquiring an image signal of a specific range including a desired object, and displaying the signal as an image. The image pickup apparatus 1 is configured to include an image pickup unit 10, a control unit 20, an inference engine 30, a communication unit 41, a recording unit 42, a display unit 43, an operation unit 44, and other components.

The image pickup unit 10 is a constituent unit of the image pickup apparatus 1, for implementing an image pickup function of picking up an image of a specific range and acquiring an image signal. That is, the image pickup unit 10 is configured of an electronic circuit and program software, for example, including an optical system 11 that forms an optical image; and an image pickup device 12 that is a photoelectric conversion element that converts the optical object image (optical image) formed by the optical system 11 into an electrical image signal. The image pickup unit 10 is controlled by a later-mentioned control unit 20. Note that the image pickup unit 10 itself only needs to have an image pickup function of converting an optical image into an electrical image signal. Hence, the configuration of the image pickup unit 10 is substantially the same as an image pickup unit applied to a conventional image pickup apparatus, and detailed descriptions of the configuration are omitted.

The control unit 20 has multiple control sections (21 to 24) controlling various types of constituents that configure the image pickup apparatus 1, an image processing section 25 that processes the image signal, and other components. The control unit 20 has centralized control over the multiple control sections (21 to 24), the image processing section 25, and other components, and thereby functions as an image pickup control unit that controls the image pickup operation of the image pickup apparatus 1. Here, the control unit 20 as the image pickup control unit performs image pickup control on the basis of an image signal acquired by the image pickup unit 10 and multiple target image dictionaries (inference models) stored in a storage section. 31 (to be described later).

Specifically, the control unit 20 is configured to include electronic circuits and program software, for example, which are a recording control section 21, a setting control section 22, a parameter control section 23, a communication control section 24, the image processing section 25, and other components.

The recording control section 21 is configured of an electronic circuit or program software that controls the recording unit 42. The recording control section 21 performs control to receive an image signal acquired by the image pickup unit 10, convert the signal into image data of a predetermined form (recording form), and record the image data in a recording medium (not shown) included in the recording unit 42. The recording control section 21 also performs control to read out image data recorded in the recording medium (not shown) of the recording unit 42, convert the image data into image data of a predetermined form (display form), and output the image data on the display unit 43, for example.

The setting control section 22 is configured of an electronic circuit or program software that controls various types of settings of the image pickup apparatus 1.

The parameter control section 23 is configured of an electronic circuit or program software that sets an image pickup parameter for appropriately picking up a picture signal indicating a specific image pickup target included in an image signal (image data) acquired by the image pickup unit 10, and controls the image pickup parameter.

To be specific, the parameter control section 23 has a function of controlling driving of a shutter mechanism, an aperture adjustment mechanism, and the like to perform exposure adjustment or the like as an image pickup parameter, for example. The parameter control section 23 also has a function of controlling driving of the image pickup unit 10 according to the state of lighting in the surrounding environment, to adjust white balance and the like. Moreover, the parameter control section 23 has a function of controlling driving of the optical system 11 included in the image pickup unit 10, to control a focusing operation of an image pickup target as a main object.

The communication control section 24 is configured of an electronic circuit or program software for controlling the communication unit 41 to perform data communication between the image pickup apparatus 1 and external equipment 100 (to be described later).

The image processing section 25 is configured of an electronic circuit or program software that generates various types of image data by performing various types of signal processing on an image signal or the like acquired by the image pickup unit 10.

Note that although not shown, the configuration of the control unit 20 also includes components such as a display control section that controls the display unit 43, and an operation control section that receives an input signal from the operation unit 44 and outputs various types of instruction signals.

The inference engine 30 is configured of an electronic circuit or program software that makes a predetermined inference (to be described later in detail) on a main object (image pickup target) included in an image displayed by an image signal acquired by the image pickup unit 10, on the basis of the image signal and inference model data (also referred to as target image dictionary) generated beforehand by the external equipment 100, for example. The inference engine 30 also performs processing such as determining a specific target type on the basis of an image signal acquired by the image pickup unit 10 and multiple target image dictionaries stored in the storage section 31, and selecting a target image dictionary corresponding to the determined specific target type from among the multiple target image dictionaries.

The inference engine 30 has a storage section 31 for previously storing at least one or multiple inference models. That is, the storage section 31 is a constituent section that stores multiple target image dictionaries (inference models) corresponding to the multiple types of targets.

Note that the inference model mentioned above is a data collection including standard patterns (templates) or the like used for making an inference on a target (object) included in an image data, the image data including an unknown target (object), for example.

Here, the inference model is generated by extracting a feature part of a predetermined target (object) by using machine learning, deep learning or the like, on the basis of mass image data accumulated in an external image database 110 (to be described later), for example.

The inference model is generated beforehand in the external equipment 100, for example. Multiple inference models generated in the external equipment 100 are stored in a storage unit (not shown) inside the external equipment 100. The image pickup apparatus 1 is configured to perform data communication with the external equipment 100 through the communication unit 41 as needed, to read out a desired inference model from the storage unit (not shown) of the external equipment 100, and store the inference model in the storage section 31 of the inference engine 30 to use the inference model when necessary.

In "deep learning", a neural network is used to configure a multilayered structure of the process of "machine learning". A typical structure is "feedforward neural network" in which detection is made by transmitting information in the forward direction.

Here, the simplest structure may include three layers which are an input layer configured of N1 neurons, an intermediate layer configured of N2 neurons given by a parameter, and an output layer configured of N3 neurons corresponding to the number of classes to be detected.

The neurons of the input layer and intermediate layer, and the intermediate layer and output layer are connected by a connection weight, and a bias value is added to the intermediate layer and the output layer, whereby a logic gate can be formed easily.

While three layers are enough for a simple determination, with a larger number of intermediate layers, multiple combinations of feature values can be learned in the process of machine learning.

In recent years, structures including 9 to 152 layers are practically used in Willis of required time for learning, determination accuracy, and consumed energy.

Other usable networks include "convolutional neural network" that uses processing referred to as "convolution" in which the feature value of an image is compressed, requires minimal processing, and commonly applied to pattern recognition, and "recurrent neural network (fully recurrent neural network)" that can handle more complex information, is applied to analysis of information changeable depending on the sequence and order, and allows bidirectional information flow.

While conventional generic processor circuits such as a CPU and an FPGA (field programmable gate array) may be used to implement such techniques, since a large part of processing of a neural network is matrix multiplication, units referred to as a GPU (graphic processing unit) and a TPU (tensor processing unit) specialized for matrix calculation are used in some cases.

Recently, a "neural network processing unit (NPU)" which is also dedicated AI hardware is sometimes designed to be collectively assembled with other circuits such as a CPU, to serve as a part of a processing circuit.

Other machine learning methods include support vector machines and support vector regression.

Here, learning is adopted to calculate the weight of a discriminator, a filter coefficient, and an offset. Instead, logistic regression processing may also be used.

When a machine is caused to make a detection, a person needs to teach the machine the manner in which to make the detection. The embodiment adopts a method in which image determination is derived by machine learning. However, a rule-based method in which a person applies a rule obtained by empirical heuristics may also be used.

The communication unit 41 is configured of an electronic circuit or program software for achieving data communication between the image pickup apparatus 1 and another external equipment (reference numeral 100 in FIG. 1) or the like.

The communication unit 41 may be configured of a so-called near field communication circuit unit or the like that performs radio data communication with other nearby external equipment, for example, or may be configured of a communication circuit unit or the like that performs data communication with other external equipment (e.g., file server (not shown)) through a network (not shown).

Note that communication means included in the communication unit 41 is not limited to the wireless communication means, and wired communication means is also included. The communication unit 41 is controlled by the communication control section 24.

The recording unit 42 is a constituent unit for recording various types of data files. Data files recorded in the recording unit 42 are mainly image data or the like acquired by the image pickup unit 10 and converted into a predetermined recording form in the image processing section 25 of the control unit 20, for example. However, information data or the like other than the image data may be recorded instead.

The display unit 43 is a constituent unit that is formed of a display panel and a drive circuit or the like (not shown) of the display panel, and implements a display function. An image based on image data acquired by the image pickup unit 10, and a menu image generated by various types of setting programs or the like are displayed on the display panel of the display unit 43. The display unit 43 is controlled by a display control section (not shown) included in the control unit 20.

The operation unit 44 is a constituent unit including multiple operation members for receiving various types of operation by the user and generating various types of corresponding instruction signals, and an electronic circuit or the like working with the operation members. The operation unit 44 is configured of a pressing type, a rotary-dial type, a slide type, a lever type, and other various types of operation members, a touch panel, and other components.

The image pickup apparatus 1 of the embodiment is configured in the above manner. Note that other constituent members of the image pickup apparatus 1 are substantially the same as a general conventional image pickup apparatus, and illustration and descriptions will be omitted.

The image pickup apparatus 1 of the embodiment configured in this manner performs data communication with the external equipment 100, and thereby acquires a necessary inference model to record the inference model in the storage section 31 of the inference engine 30. Thus, in order to pick up a desired image pickup target, the image pickup apparatus 1 performs predetermined inference processing using the inference engine 30, on the basis of an inference model corresponding to the image pickup target and image data acquired by the image pickup unit 10, and acquires an appropriate image data.

Hereinbelow, a brief description will be given of the external equipment 100 that performs data communication with the image pickup apparatus 1 of the embodiment.

The external equipment 100 is electronic equipment configured to perform data communication of predetermined data with the image pickup apparatus 1 of the embodiment. The external equipment 100 is configured to include a learning unit 101, an external image database (DB) 110, and an equipment control unit 107 that has centralized control over the external equipment 100.

Note that although in the example shown in FIG. 1 the single external equipment 100 is configured to include the learning unit 101 and the external image database 110, the invention is not limited to this form. For example, separate external equipment including the external image database 110 may be configured in addition to external equipment including the learning unit 101. In this case, the external equipment are configured to be capable of performing data communication with each other through a communication unit.

The learning unit 101 is configured of an electronic circuit or program software having a function of creating an inference model (target image dictionary). The learning unit 101 is configured to include a population creation section 102, an output setting section 103, an input-output modeling section 104, a communication section 105, and other components.

The population creation section 102 is an electronic circuit or program software that creates an image population as learning material corresponding to the inference model to be created.

As will be described later, mass image data accumulated in the external image database 110 is classified and sorted by an image classification section 112 (to be described later), and is recorded in a data storage 111 in multiple image groups.

Accordingly, the population creation section 102 reads out image group data of an image pickup target (object) corresponding to the inference model to be created from the external image database 110, and creates an image population.

The output setting section 103 is an electronic circuit or program software for setting necessary information for extracting various types of information from each piece of image data of the image population created by the population creation section 102.

At this time, information extracted from the image data is information on the feature part of a target, information on an image pickup parameter when picking up the image of the target, and information on an appropriate composition of the target, for example.

In other words, information on the feature part of a target is information on the feature part that should be focused when creating an inference model. Specifically, if the target is "bird", for example, the information on the feature part is information on feature points of the target such as the position of the eyes or legs of the bird.

Information on an image pickup parameter is setting information of the image pickup apparatus 1, such as exposure data including the shutter speed and aperture value, and white balance information, for example. Note that the information on the image pickup parameter is recorded as so-called metadata accompanying each piece of image data included in an image population, for example.

Information on composition is information such as the arrangement and size within the screen, of a target included in each piece of image data.

The input-output modeling section 104 is an electronic circuit or program software that performs modeling processing on the basis of multiple pieces of image data included in the image population created by the population creation section 102 and various types of information set by the output setting section 103, and outputs the processing result as a learning model.

The communication section 105 is an electronic circuit or program software for performing predetermined data communication between the learning unit 101 and the communication unit 41 of the image pickup apparatus 1, or between the learning unit 101 and a communication section 113 of the external image database 110.

The external image database (DB) 110 is configured to include mass data storage (hereinafter abbreviated simply as data storage) 111, the image classification section 112, the communication section 113, and other components.

The data storage 111 is a mass storage unit that accumulates mass image data. Multiple similar image data collections classified and sorted by the image classification section 112 are recorded in the data storage 111.

The example in FIG. 1 shows, as examples of multiple similar image data collections, "target A image group 111a" in which a large amount of image data including a type "A" (specifically, "bird", for example) object as the image pickup target, and similarly, "target B image group 111b" in which a large amount of image data including a type "B" (specifically, "dog", for example) object as the image pickup target.

Teaching data may be available as a collection of several pieces of data for each target, and may be used for annotation. The type of inference engine installed in a camera or mobile equipment is a compact type having less layers and required to present high performance with low power consumption, and is therefore different from a normal type of inference engine that searches for problems in a PC or the like. Learning in a compact inference engine is difficult since a high-precision determination is made with less layers. Hence, learning takes time and work, and the inference engine requires creativity to use successfully. For example, it is important to have creativity like preparing an inference engine in which different learning is performed for each target as described earlier.

Note that although not shown in FIG. 1, the data storage 111 accumulates other various types of object-based image groups such as "cat image group", "fall colors image group", "dessert image group", and "selfie image group".

The image classification section 112 is configured of an electronic circuit or program software that performs classification and sorting processing based on a predetermined rule on mass image data accumulated in the data storage 111, and generates similar image data collections of a predetermined form. Here, the predetermined rule by which the image classification section 112 classifies and sorts is the type of object of the image pickup target, for example.

The communication section 113 is configured of an electronic circuit or program software for performing predetermined data communication with the communication section 105 of the learning unit 101.

Note that as mentioned earlier, the external equipment 100 has a function as data storage accumulating mass image data, and also has a function of performing various types of data processing on the basis of the pieces of image data, for example. Hence, the external equipment 100 corresponds to a large-capacity server system connected to a network, for example. However, other forms are also applicable as the form of the external equipment 100, such as a general small computer, and more specifically, a small desktop computer with a built-in mass data storage, for example.

Thus, the external equipment 100 generates multiple inference models corresponding to each image pickup target on the basis of mass image data, and stores the inference models. Then, the image pickup apparatus 1 reads the desired inference model from among the multiple inference models as needed, and records the inference model in the storage section 31 of the inference engine 30.

In order to pick up a desired image pickup target, the image pickup apparatus 1 performs predetermined inference processing using the inference engine 30, on the basis of an inference model corresponding to the image pickup target and image data acquired by the image pickup unit 10, and acquires appropriate image data.

Hereinafter, effects of an image pickup operation using the image pickup apparatus 1 configured in the above manner will be described.

Figure 2:
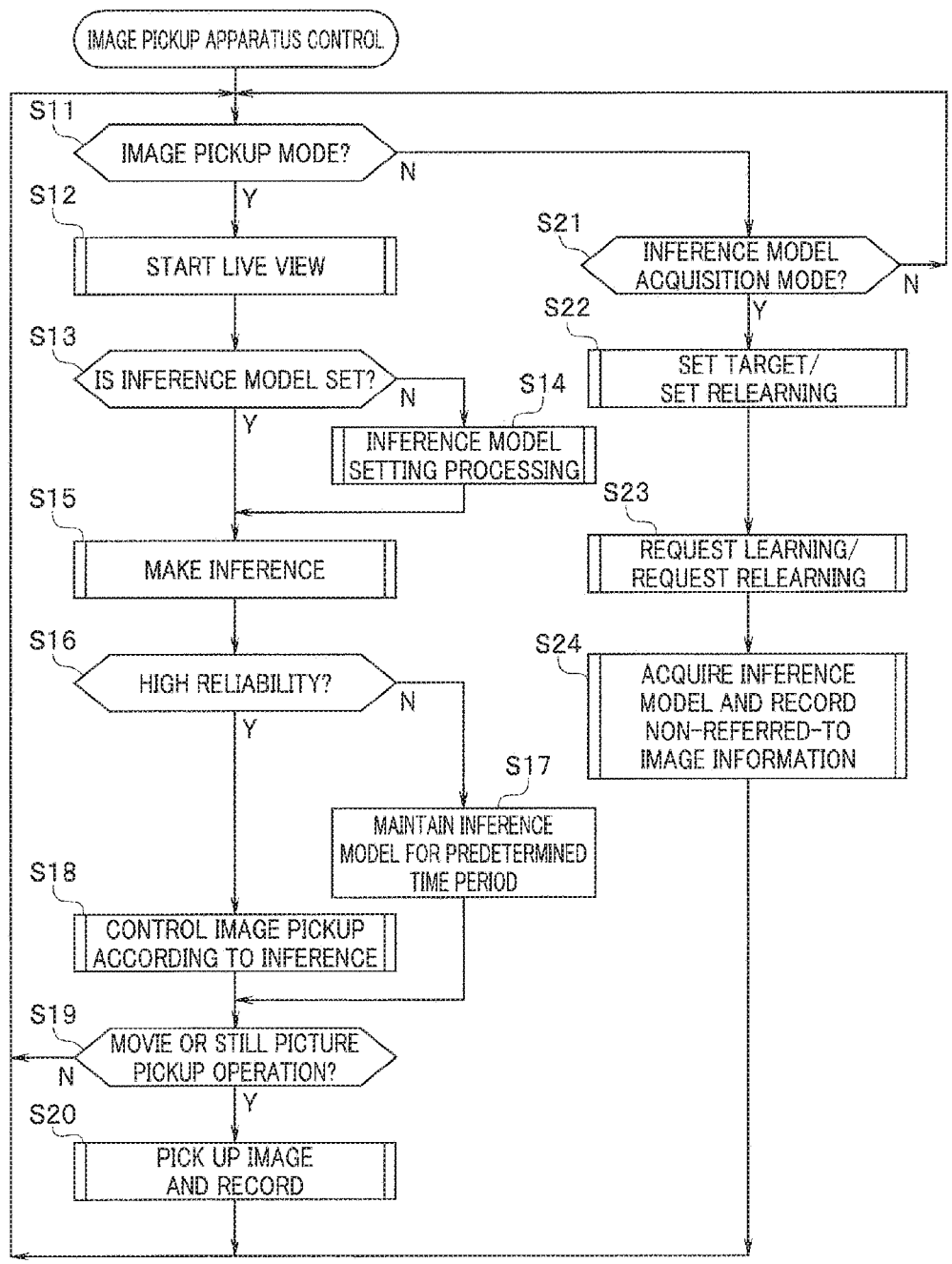
FIG. 2 is a flowchart showing a control processing sequence of the image pickup apparatus of the embodiment of the present invention.
Figure 3:
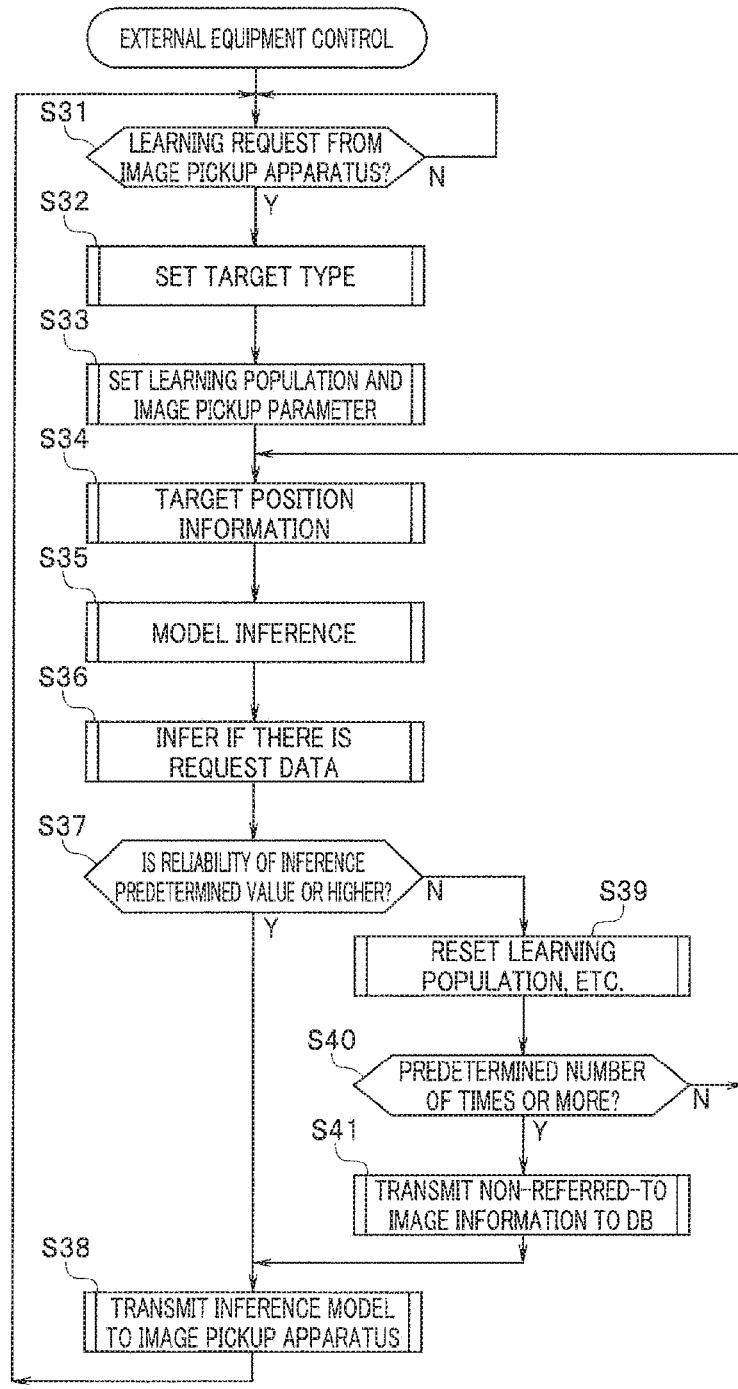
FIG. 3 is a flowchart showing a control processing sequence of the external equipment that performs data communication with the image pickup apparatus of the embodiment of the present invention.

FIG. 2 is a flowchart showing a control processing sequence of the image pickup apparatus of the embodiment. FIG. 3 is a flowchart showing a control processing sequence of the external equipment that performs data communication with the image pickup apparatus of the embodiment.

Note that the processing sequence shown in FIGS. 2 and 3 only show parts of the processing sequence of the image pickup apparatus and the external equipment related to the present invention, and do not show the overall processing sequence of the image pickup apparatus and the external equipment, as a matter of course.

Figure 4:
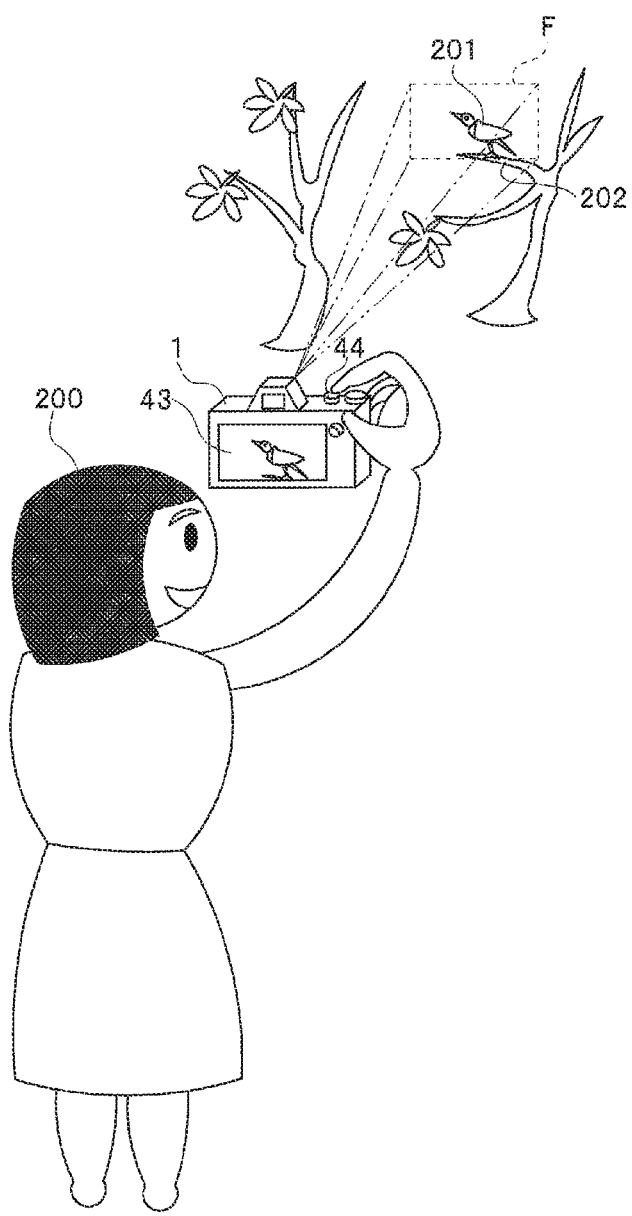
FIG. 4 is a diagram conceptually showing how an image pickup operation is performed by use of the image pickup apparatus of the embodiment of the present invention, and is a conceptual diagram showing the state of an image pickup operation by use of the image pickup apparatus.
Figure 5:
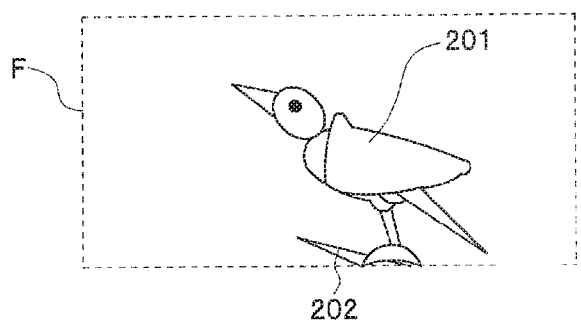
FIG. 5 is an enlarged view conceptually showing an area whose image may be picked up by the image pickup apparatus in the state of FIG. 4.

FIGS. 4 and 5 are diagrams conceptually showing how the image pickup operation is performed by use of the image pickup apparatus 1 of the embodiment. Of the drawings, FIG. 4 is a conceptual diagram showing how the image pickup operation is performed by use of the image pickup apparatus of the embodiment. FIG. 5 is an enlarged view conceptually showing an area whose image may be picked up by the image pickup apparatus in the state of FIG. 4.

For example, the example shown in FIG. 4 shows how a user 200 holds the image pickup apparatus 1 of the embodiment and is about to pick up an image of a desired image pickup target (object) 201.

Specifically, the user 200 holds the image pickup apparatus 1 toward the desired image pickup target (object) 201, for example. Here, in the example shown in FIG. 4, "bird" is illustrated as the image pickup target (object) 201, and more specifically, a state where the "bird" is on a branch 202 of a tree is exemplified.

At this time, the image pickup unit 10 of the image pickup apparatus 1 acquires an image signal of a substantially rectangular image pickup range (reference sign F) indicated by a dotted line in FIG. 4, for example. Here, image pickup range F is a predetermined range including the desired image pickup target 201 (object is "bird"), as shown in the enlarged view of FIG. 5.

In this state, as shown in FIG. 4, an image based on the image data acquired by the image pickup unit 10 is displayed on the display unit 43 of the image pickup apparatus 1.

First, before describing the control processing sequence (FIG. 2) of the image pickup apparatus 1 of the embodiment, a brief description of the effect of the image pickup apparatus 1 will be given.

When the user desires to pick up an image of a specific image pickup target (e.g., "bird") by using the image pickup apparatus 1 previously provided with inference models, first, an inference model (bird dictionary, see FIG. 7) corresponding to "bird" which is the desired image pickup target is set to be used in the image pickup apparatus 1.

Then, the user actuates the image pickup apparatus 1, and holds the image pickup apparatus 1 toward the desired image pickup target "bird".

At this time, a live view image based on image data successively acquired by the image pickup unit 10 is displayed on the display unit 43 of the image pickup apparatus 1.

Then, when "bird" is included in the live view image, detection of each piece of image data of each frame that configures the live view image, and the image pickup target (main object) based on the bird dictionary is performed.

With this, when the image pickup target "bird" is detected in the image data, an image pickup parameter corresponding to the image pickup target "bird" is read out from the bird dictionary.

At the same time, an appropriate image pickup parameter is set according to the read out image pickup parameter and the settings and surrounding environment of the image pickup apparatus 1.

Then, based on the live view image and the bird dictionary, a shutter release signal is automatically generated at a predetermined timing (e.g., at a good composition) most appropriate for the corresponding image pickup target "bird", to perform the image pickup operation.

Hence, in order to pick up an image of a desired image pickup target such as "bird", a corresponding inference model (bird dictionary) is set to be used in the image pickup apparatus 1. When the desired image pickup target ("bird" in this case) is captured in a live view image, the image pickup target ("bird" in this case) is detected on the basis of the image data of the live view image and the inference model (bird dictionary). Additionally, an image pickup parameter appropriate for the image pickup target "bird" is automatically set according to the surrounding environment. Then, the image pickup operation is automatically performed at a predetermined timing such as at an appropriate composition.

Accordingly, an excellent image including a desired image pickup target can be acquired easily at any time.

Note that in the automatic setting of the image pickup parameter, as for the exposure setting, in a case where an image of "bird" is to be picked up and the user is observing a flying bird with an ultra-long focus lens, for example, an exposure value prioritizing a fast shutter speed value is automatically set. When "bird" on a branch in a still state is the target, for example, an exposure value prioritizing a wider aperture value is automatically set. Thus, settings of the shutter speed value and aperture value are set automatically to automatically set the exposure.

Moreover, as the composition setting, in order to achieve an ideal composition, for example, a guide of the position of the image pickup target in the screen may be superimposed on a live view image, or slight movements of the image pickup target may be detected continuously. With this, the automatic focus may be maintained even if "bird" faces the front, the side, or the back, and also control may be performed so that a shutter release signal is automatically generated at the timing when the face of "bird" is directed in an ideal direction.

The control processing sequence of the image pickup apparatus 1 of the embodiment is as shown in FIG. 2. First, the control processing sequence of the image pickup apparatus 1 will be described below.

When starting the control processing sequence shown in FIG. 2, first, the image pickup apparatus 1 is powered on, and in a usable state.

In this state, in step S11 of FIG. 2, the control unit 20 confirms whether or not the currently set operation mode is image pickup mode. Here, if it is confirmed that the image pickup mode is set, the processing proceeds to the next step S12. If an operation mode other than the image pickup mode is set, the processing proceeds to step S21.

In step S12, the control unit 20 controls the image pickup unit 10, the display unit 43, and other components to start a live view operation.

That is, the control unit 20 drives and controls the image pickup unit 10, and photoelectrically converts an optical image formed by the optical system 11 to generate an image signal. The image signal acquired by the image pickup unit 10 is outputted to the image processing section 25 of the control unit 20. Upon receipt of the image signal, the image processing section 25 performs predetermined image signal processing on the image signal to generate image data in display form, and outputs the image data to the display unit 43. Upon receipt of the image data, the display unit 43 displays an image based on the image data. By continuously repeating the sequential processing, a movie as a so-called live view image (also referred to as a through image) is displayed on the display screen of the display unit 43.

Next, in step S13, the control unit 20 confirms whether or not an appropriate inference model is set. Here, if the inference model is already set, the processing proceeds to the next step S15. If the inference model is not yet set, the processing proceeds to step S14.

In step S14, the control unit 20 performs a subroutine of inference model setting processing. Although the inference model setting processing subroutine is omitted from FIG. 2, the processing is as follows, for example.

An example of the inference model setting processing subroutine is processing of automatically setting an appropriate inference model corresponding to the image pickup target (object) included in the live view image.

Specifically, multiple types of inference models corresponding to each object are previously stored in the storage section 31 of the inference engine 30, for example.

In this state, tentative inference processing is performed multiple times on a main object (hereinafter referred to as main object) in the live view image, by use of an arbitrary inference model prestored in the storage section 31.

Thereafter, an inference model having high reliability on the main object of the live view image is automatically selected, and the selected inference model is set to be used.

Figure 6:
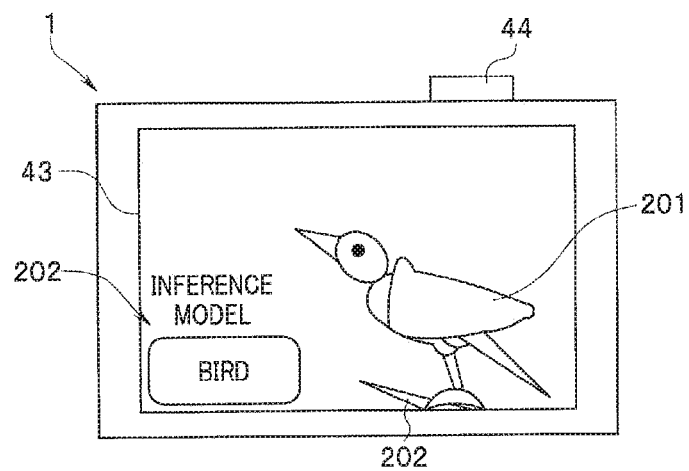
FIG. 6 is a diagram showing a display example of a display unit of the image pickup apparatus of the embodiment of the present invention.

Information on the inference model thus set automatically is superimposed on a live view image displayed on the display screen of the display unit 43 as shown in FIG. 6, for example. Here, FIG. 6 is a display example of displaying a processing result on the display unit when the inference model automatic setting processing is performed during display of a live view image. FIG. 6 shows an example in which the information is displayed by use of characters or a predetermined icon (reference numeral 202 of FIG. 6).

Moreover, another example of the inference model setting processing subroutine is processing in which the user performs manual operation, to set an appropriate inference model corresponding to an image pickup target (main object) included in the live view image that is an object whose image the user desires to pick up.

Specifically, multiple types of inference models corresponding to each object are previously stored in the storage section 31 of the inference engine 30, for example.

In this state, the user switches the operation mode of the image pickup apparatus 1 to setting mode, and performs a predetermined manual operation.

Figure 7:
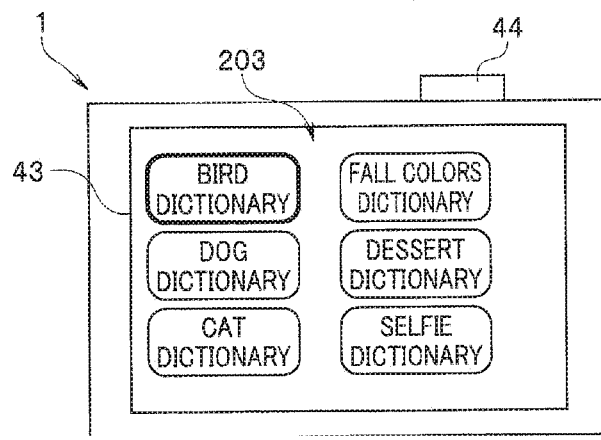
FIG. 7 is a diagram showing a display example of an inference model selection screen (image dictionary selection screen) of the display unit of the image pickup apparatus of the embodiment of the present invention.

Thus, an inference model selection screen (image dictionary selection screen) as shown in FIG. 7 is displayed on the display screen of the display unit 43. Here, FIG. 7 is an example of screen display when the operation mode of the image pickup apparatus is set to setting mode, and exemplifies a state where an inference model selection and setting screen is displayed.

In the inference model selection and setting screen, as shown in FIG. 7, multiple inference models (target image dictionaries) previously stored in the storage section 31 of the inference engine 30 of the image pickup apparatus 1 are displayed in a list (reference numeral 203 in FIG. 7). The example shown in FIG. 7 exemplifies a state where names, icons, or the like are displayed to indicate each of the inference models.

The user selects and sets a desired inference model by use of a predetermined operation member included in the operation unit 44, during display of the inference model list display screen. For example, if the image pickup apparatus 1 is configured such that a touch panel as an operation unit is arranged in an overlapping manner on the display screen of the display unit 43, the user touches an icon or the like displaying a desired inference model from the list displayed on the display screen with his/her finger.

Then, the displayed icon of the selected and set inference model changes to a display form visibly recognizable by flashing or emphasizing, for example. In the example shown in FIG. 7, as a display example of emphasizing the selected inference model, a frame surrounding the characters of the name indicating the inference model is displayed in a bold frame.

Thus, the inference model corresponding to the image pickup target (object) whose image the user is to pick up is selected and set.

Thereafter, image pickup is started by use of the image pickup apparatus 1. At this time, the operation mode of the image pickup apparatus 1 is switched from setting mode to image pickup mode. Here, a display shown in FIG. 6, that is, information on the set inference model may be superimposed on the live view image, for example.

When the inference model is thus set, referring back to FIG. 2, in the next step S15, the control unit 20 controls the image pickup unit 10 and the inference engine 30 to perform predetermined inference processing.

The inference processing in this case is predetermined processing performed on image data (i.e., live view image) acquired by the image pickup unit 10 on the basis of the set inference model. For example, the inference processing is processing including extraction of feature points of a main object (image pickup target) included in the image data, and matching of the extracted feature point data to the inference model to draw an inference result. Since the inference processing is processing conventionally performed in general in machine learning and the like, detailed descriptions will be omitted.

Next, in step S16, the control unit 20 confirms whether or not the inference result of the inference processing in the aforementioned step S15 has high reliability. Here, if it is determined that reliability of the inference result is low, the processing proceeds to step S17. If it is determined that reliability of the inference result is high, the processing proceeds to the next step S18.

In step S17, the control unit 20 maintains the set inference model for a predetermined time period.

Here, in the state shown in FIG. 2, assume that the user has captured a desired image pickup target 201 (object) within image pickup range F by use of the image pickup apparatus 1, for example. The live view image displayed on the display unit 43 at this time is as shown in FIG. 6, for example. At this time, the "bird" inference model is set in the image pickup apparatus 1.

In this state, the image pickup apparatus 1 performs control processing of step S18 on the basis of the inference result of the inference processing in the aforementioned step S15. The control processing includes control such as a focusing operation of identifying "bird" which is the main object in the live view image, and focusing on the "bird".

In this case, since the image pickup target 201 is a creature such as "bird", the image pickup target 201 is bound to move around over time, even if the user 200 fixes the image pickup apparatus 1.

Figure 8:
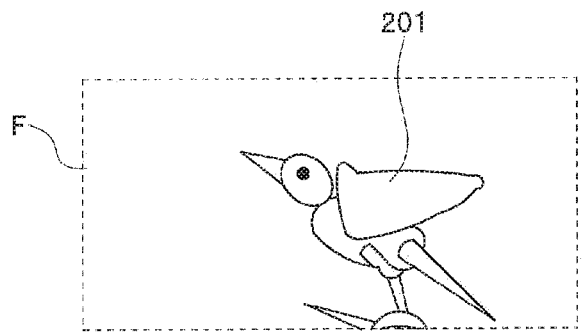
FIG. 8 is a conceptual diagram showing a state where an image pickup target "bird" is about to move to fly away from a branch from the state of FIG. 6.
Figure 9:
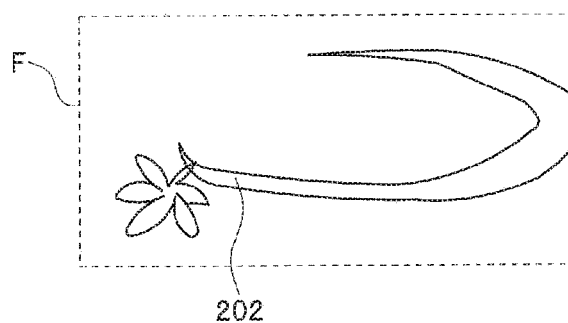
FIG. 9 is a conceptual diagram showing a state where the image pickup target "bird" has gone out of the image pickup range from after the state of FIG. 8.

For example, FIG. 8 shows a state where "bird" which is the image pickup target 201 is about to move and fly away from the branch 202 from the state of FIG. 6. FIG. 9 shows a state where "bird" which is the image pickup target 201 has gone out of image pickup range F after the state of FIG. 8. Only the branch 202 is displayed on the live view image at this time. Moreover, FIG. 10 shows a state where the user has held up the image pickup apparatus 1 again and recaptured "bird" which is the image pickup target 201 after moving, within image pickup range F.

Thus, even when the desired image pickup target 201 moves within image pickup range F of the image pickup apparatus 1, the image pickup apparatus 1 continues to perform focusing control of identifying the image pickup target 201 and focusing on the image pickup target 201, as long as the image pickup target 201 is included within image pickup range F. Moreover, even if the image pickup target 201 goes out of the image pickup range, the set inference mode is maintained within a predetermined time period (step S17).

Figure 10:
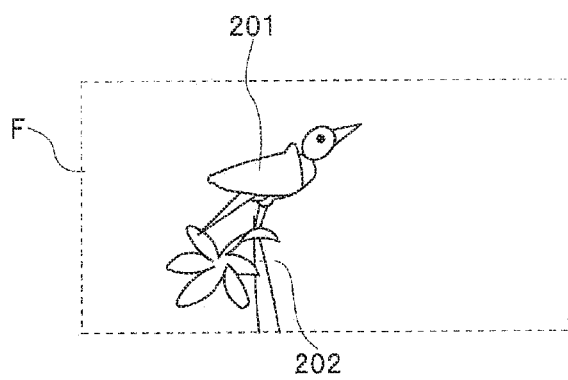
FIG. 10 is a conceptual diagram showing a state where the user has held up the image pickup apparatus again and recaptured the image pickup target "bird" after moving, within the image pickup range.

Then, from the state of FIG. 9, if the user recaptures "bird" which is the image pickup target 201 after moving as in FIG. 10 by holding up the image pickup apparatus 1 again, for example, the inference using the maintained inference model is continued.

Referring back to FIG. 2, in step S18, the control unit 20 controls the parameter control section 23, the display unit 43, and other components to perform appropriate image pickup control processing according to the inference result of the inference processing in the aforementioned step S15. Here, the image pickup control processing is control processing of setting various types of image pickup parameters matching the object as the image pickup target, for example.

In step S19, the control unit 20 confirms whether a start instruction of image pickup operation processing of a movie or a still picture is given.

Here, if a start instruction of the image pickup operation processing of a movie or a still picture is confirmed, the processing proceeds to the next step S20. If the start instruction of the image pickup operation processing of a movie or a still picture is not confirmed, the processing returns to step S11.

Note that the start instruction of the image pickup operation processing of a movie or a still picture is a shutter release signal, for example. The shutter release signal is a signal generated when the user operates a release operation member included in the operation unit 44, for example. Instead, the shutter release signal may be automatically generated at a predetermined appropriate timing in the image pickup control processing of the aforementioned step S18, for example. In this case, specifically, control may be performed to automatically generate a shutter release signal at a timing when the position or the like of the image pickup target within the live view image comes to an appropriate position (when a composition appropriate to the image pickup target can be achieved).

In step S20, the control unit 20 controls the image pickup unit 10 to perform the image pickup operation, and then controls the image processing section 25, the recording unit 42, and other components to perform record processing.

Note that in the case of still picture image pickup operation processing, the image pickup operation is started upon receipt of the aforementioned start instruction signal, and ends after predetermined sequential processing. In the case of movie image pickup operation processing, the image pickup operation is started upon receipt of the aforementioned start instruction signal, and then the operation ends when the release operation member is operated again, or upon receipt of another shutter release signal automatically generated after a predetermined time period has elapsed. Then, the processing returns to step S11.

On the other hand, if it is confirmed that the currently set operation mode is a mode other than image pickup mode in the processing of the aforementioned step S11, and the processing proceeds to step S21, and continues in the following manner.

That is, in step S21, the control unit 20 confirms whether or not the currently set operation mode is inference model acquisition mode. Here, the inference model acquisition mode is an operation mode for acquiring an inference model to be used in the image pickup apparatus 1 from the external equipment 100, for example.

If it is confirmed that the inference model acquisition mode is set, the processing proceeds to the next step S22. If a mode other than the inference model acquisition mode is set, it is confirmed whether other operation modes such as reproduction mode is set.

However, effects of other operation modes are parts that are not directly related to the present invention. Hence, in the flowchart of FIG. 2, the processing sequence related to other operation modes is omitted and the processing returns to the aforementioned step S11. Descriptions of the other operation modes are omitted.

In step S22, the control unit 20 performs target setting processing. In this case, for example, the control unit 20 controls the setting control section 22, the display unit 43, and other components to cause an inference model selection screen as shown in FIG. 7 to be displayed on the display screen of the display unit 43. The user performs a setting operation on the selection screen by using the operation unit 44 (e.g., touch panel), to select an inference model corresponding to the desired image pickup target. Thus, the inference model corresponding to the image pickup target that the user desires is set.

Additionally, in the processing of the step S22, relearning processing is set for the inference model corresponding to the desired image pickup target if necessary.

Next, in step S23, the control unit 20 controls the setting control section 22, the display unit 43, and other components to perform learning request processing and relearning request processing if necessary.

This is often required at the time of image pickup (e.g., observation and photographing) to surely pick up an image of a special target under situations different from when picking up a general image of a person, since points to be considered during photographing differ among targets.

For example, when photographing a bird, sometimes, the part to be focused, or the part to be emphasized in color tone differ depending on the kind of the bird. That is, image pickup is more likely to succeed if the detection based on the bird type and image used for accurate photographing is customized.

Accordingly, needs for picking up images of specific categories may be set by text, image, and the like to be requested. If various types of dictionaries were assembled at the time of production and is provided in an apparatus, or a target that the user desires matches the dictionaries, that is enough for image pickup and photographing. Hence, relearning is unnecessary.

Here, learning request processing is processing of instructing the external equipment 100 or the like a request for generating a new inference model for a new desired image pickup target, for example. The instruction is referred to as learning request instruction, for example.

Relearning request processing is processing of instructing the external equipment 100 or the like to perform update processing of an existing inference model corresponding to a predetermined image pickup target, by adding new image data (e.g., image data newly acquired by the user) to the learning population of the existing inference model, and performing machine learning or the like again.

In the relearning request processing, the image pickup apparatus 1 transmits, as information for requesting relearning to the external equipment 100, predetermined information (hereinafter referred to as request data) including new image data acquired by the user to the external equipment 100.

The learning request processing and relearning request processing are performed upon receipt of a predetermined operation that the user performs as needed.

In step S24, the control unit 20 acquires the inference model selected and set in the processing of the aforementioned step S22 through data communication with the external equipment 100, for example.

In addition, in the processing of the step S24, the control unit 20 performs non-referred-to image information record processing. The non-referred-to image information record processing is processing of recording image data included in the request data transmitted in the relearning request processing in the aforementioned step S22 as "non-referred-to image information".

Next, a control processing sequence of the external equipment 100 that performs data communication with the image pickup apparatus 1 of the embodiment will be described below with reference to FIG. 3. When starting the control processing sequence shown in FIG. 3, first, the external equipment 100 is powered on, and in a usable state.

In this state, in step S31 of FIG. 3, the equipment control unit 107 of the external equipment 100 confirms whether or not a learning request instruction (see step S23 of FIG. 2) is included in instruction information transmitted from the image pickup apparatus 1. Here, if it is confirmed that a learning request instruction has been transmitted from the image pickup apparatus 1, the processing proceeds to the next step S32. If it is not confirmed that a learning request instruction has been transmitted from the image pickup apparatus 1, the same confirmation processing is repeated until the learning request instruction is confirmed.

In step S32, the equipment control unit 107 performs image pickup target type setting processing. The image pickup target type setting processing is processing of setting a type of an image pickup target corresponding to an inference model to be generated, on the basis of various types of information included in the learning request instruction that is transmitted from the image pickup apparatus 1 toward the external equipment 100 in the processing of step S23 of FIG. 2, and received in the processing of the aforementioned step S31.

Next, in step S33, the equipment control unit 107 performs learning population setting and image pickup parameter setting processing. The learning population setting processing is processing of reading out multiple pieces of image data corresponding to the image pickup target type set in the processing of the aforementioned step S32 from the external image database 110, and setting the image data as the learning population (mass image data to be targeted for machine learning).

The image pickup parameter setting processing is processing of reading out predetermined image pickup parameter information from among image pickup parameter information associated to each piece of mass image data included in the set learning population, and associating the image pickup parameter information with the generated inference model.

In step S34, the equipment control unit 107 performs a process of collecting information on the position of the image pickup target in each piece of image data from mass image data included in the set learning population, and associating the position information with the inference model to be generated.

In step S35, the equipment control unit 107 performs inference modeling processing. The inference modeling processing is processing of integrating the processing results of the aforementioned steps S32 to S34, and generating a predetermined inference model.

In step S36, if request data is sent from the image pickup apparatus 1 (i.e., if relearning request is made), the equipment control unit 107 performs inference processing (i.e., relearning processing) based on the request data.

In step S37, the equipment control unit 107 confirms whether or not the reliability of the result of inference processing of the aforementioned step S36 is not lower than a predetermined value. Here, if the reliability is not lower than the predetermined value, the processing proceeds to the next step S38. If the reliability is lower than the predetermined value, the processing proceeds to step S39.

In step S38, the equipment control unit 107 performs transmission processing of transmitting a newly generated inference model or an inference model updated by the result of relearning to the image pickup apparatus 1. With this, the image pickup apparatus 1 acquires the inference model in the processing of step S24 in FIG. 2. Thereafter, the processing returns to step S31.

On the other hand, if it is determined in the processing of the aforementioned step S37 that the reliability of the inference model is low and the processing proceeds to step S39, in the step S39, the equipment control unit 107 performs reset processing of the learning population and the image pickup parameter information.

In step S40, the equipment control unit 107 confirms whether or not the processing of step S39 has been repeated for not less than a predetermined number of times. Here, if the number is more than the predetermined times, the processing proceeds to the next step S41. If the number is less than the predetermined times, the processing returns to step S34, and the following processing is repeated.

In step S41, the equipment control unit 107 performs non-referred-to image information transmission processing. Here, the non-referred-to image information transmission processing is processing of transmitting, when a highly reliable inference result could not be obtained by not less than a predetermined number of machine learning or the like, the target image data (image data included in request data) to the external image database 110 as an image inappropriate for generating the inference model, that is, as "non-appropriate-to-be-referred-to-later image". With this, the external image database 110 records the image data (non-referred-to image information) in a predetermined area.

As has been described, according to the embodiment, the image pickup apparatus 1 that acquires an image signal within a predetermined range including a desired specific image pickup target is configured to include: the image pickup unit 10 that takes an image of a specific range to acquire an image signal; the parameter control section 23 that controls an image pickup parameter for appropriately picking up an image of a picture signal indicating a specific target included in the image signal acquired by the image pickup unit 10; a storage section 31 that stores multiple target image dictionaries (inference models) respectively corresponding to multiple types of targets; and the control unit 20 that performs image pickup control by using the target image dictionary selected from among the multiple target image dictionaries. Here, the multiple target image dictionaries are previously generated by and read from the external equipment 100 or the like, and is previously stored in the storage section 31.

With this configuration, the image pickup apparatus 1 performs predetermined inference processing on the basis of image data (live view image) acquired by the image pickup unit 10, and a target image dictionary (inference model) selected from among multiple target image dictionaries.

According to the inference processing, the type of the image pickup target (main object) included in the live view image is determined, the determined image pickup target (main object) is set as the desired image pickup target, an image pickup parameter appropriate for picking up an image of the set image pickup target is set, and control is performed to follow the set image pickup target within the image pickup range and continuously focus on the image pickup target, for example. Then, when a shutter release signal is generated, an image pickup operation is performed at an appropriate predetermined timing. In this case, the shutter release signal may be generated from a manual operation of a release operation member by a user, or may be control performed to automatically generate a shutter release signal at a timing of an appropriate composition, for example.

With the above-mentioned effects, the image pickup apparatus 1 of the embodiment can automatically and appropriately determine various types of settings such as the image pickup parameter depending on the settings of the apparatus, the surrounding environment, and the type of desired specific image pickup target (desired object). Hence, an excellent image pickup result (image data including desired image pickup target) can be acquired easily at any time.

Additionally, in the image pickup apparatus 1 of the embodiment, relearning processing of an inference model based on image data (request data) acquired by the image pickup unit 10 can be requested to the external equipment 100 (relearning request processing of step S23 of FIG. 2). With this, an inference model according to the image pickup tendency and preference of the user can be remodeled.

Note that teaching data may be available as a collection of several pieces of data for each target, and may be used for annotation. In this case, since the number of pieces and the like is known, such information may be inputted as specification information at the time of annotation. Learning time may depend on this information.

The type of inference engine installed in a camera or mobile equipment is a compact type having less layers and required to present high performance with low power consumption, and is therefore different from a normal type of inference engine that searches for problems in a PC or the like. Learning in a compact inference engine is difficult since a high-precision determination is made with less layers. Hence, learning takes time and work. Accordingly, it is important to use correctly annotated teaching data for learning.

Next, a modification of effects of the image pickup apparatus 1 of the above embodiment will be described below with reference to FIGS. 11 and 12.

Figure 11:
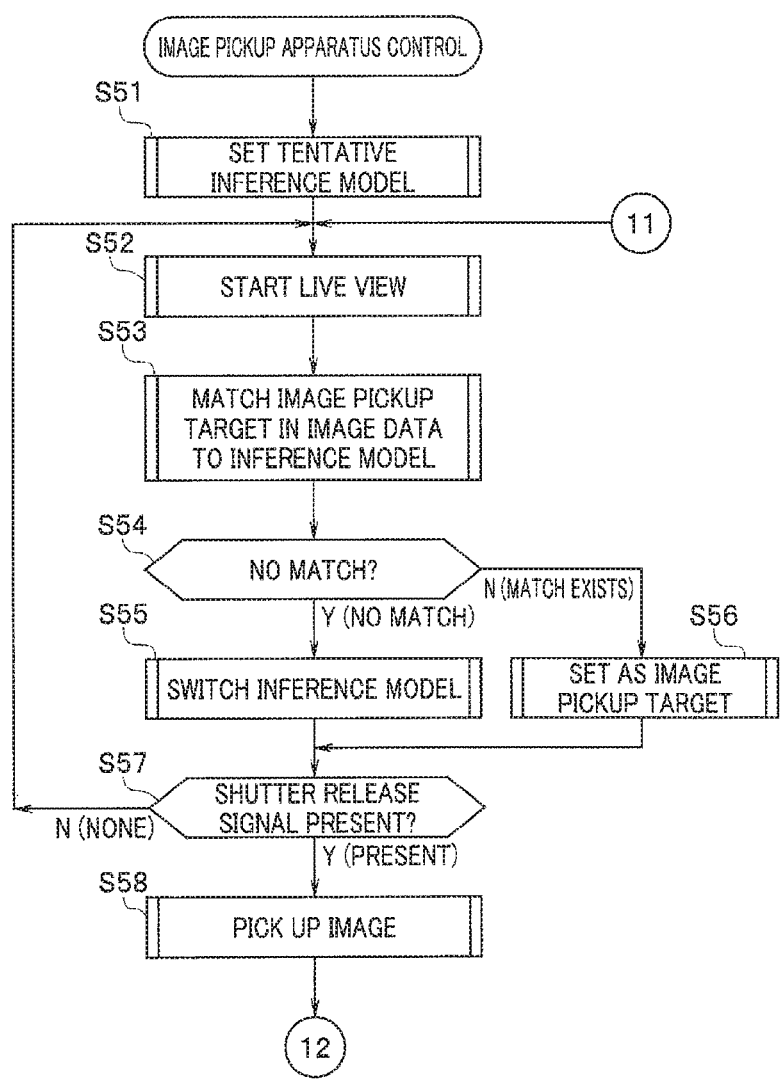
FIG. 11 is a flowchart (former half) showing a modification of the control processing sequence of the image pickup apparatus of the embodiment of the present invention.
Figure 12:
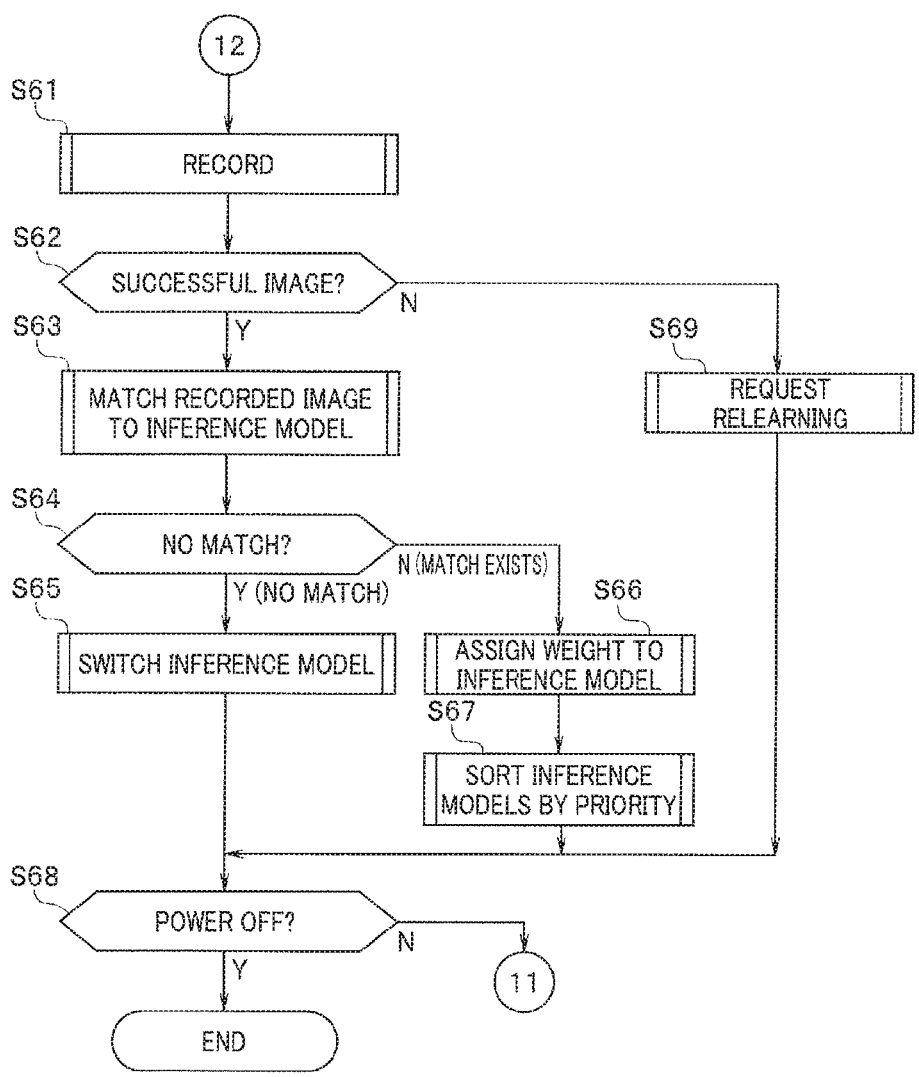
FIG. 12 is a flowchart (latter half) of the modification of the control processing sequence of the image pickup apparatus of the embodiment of the present invention.

FIGS. 11 and 12 are flowcharts showing a modification of control processing sequences of the image pickup apparatus of the embodiment of the present invention.

In the behavior examples shown in FIGS. 11 and 12, of pieces of image data acquired by an image pickup apparatus 1, "successful image" is used to weigh an inference model corresponding to the image pickup target included in the image, to set priority levels of multiple inference models previously stored in a storage section 31 of the image pickup apparatus 1. With this, in the image pickup apparatus 1, the inference model frequently used according to the use tendency of a main user (e.g., owner) is preferentially selected.

Note that the "successful image" refers to an image that includes a specific image pickup target that the user desires and matches the image pickup intention of the user, among the multiple pieces of image data acquired and recorded by the image pickup unit 10 of the image pickup apparatus 1, for example.

In step S51, a control unit 20 performs tentative setting processing of an inference model. The tentative inference model setting processing is processing of setting an inference model automatically used at the time of startup of the image pickup apparatus 1, for example.

The tentative setting processing is processing for assigning a higher priority to an inference model that the user of the image pickup apparatus 1 uses frequently, or an inference model previously designated by the user. Instead, a predetermined inference model may be selected and be set tentatively from among multiple inference models, according to other predetermined procedures.

In step S52, the control unit 20 controls the image pickup unit 10, the display unit 43, and other components to start a live view operation.

Next, in step S53, the control unit 20 performs matching processing between a specific image pickup target (main object) included in an image data (live view image) acquired by the image pickup unit 10 and an inference model set tentatively in the processing of the aforementioned step S51.

In step S54, the control unit 20 confirms whether or not, as a result of the matching processing of the aforementioned step S53, the image pickup target included in the image data (live view image) matches (corresponds to) the image pickup target included in the tentative inference model. If there is no correspondence, the processing proceeds to the next step S55. If there is correspondence, the processing proceeds to step S56.

In step S56, the control unit 20 performs processing of setting the image pickup target determined to be applicable in the processing of the aforementioned step S54 as the specific image pickup target. In addition to the setting of the specific image pickup target, the setting processing also includes setting of information on the image pickup parameter corresponding to the specific image pickup target, for example. Thereafter, the processing proceeds to step S57.

On the other hand, when the processing proceeds to step S55 of no correspondence, in the step S55, the control unit 20 performs processing of switching the tentative inference model to another inference model.

Next, in step S57, the control unit 20 confirms whether a shutter release signal is generated. Here, if a shutter release signal is confirmed, the processing proceeds to the next step S58. If the shutter release signal is not confirmed, the processing returns to the aforementioned step S52, and the following processing is repeated.

In step S58, the control unit 20 performs normal image pickup operation processing. Thereafter, the processing proceeds to step S61 of FIG. 12 (reference numeral 12 of FIGS. 11 and 12).

In step S61 of FIG. 12, the control unit 20 performs normal record processing of recording an image signal (image data) acquired in the processing of step S58 in FIG. 11.

In step S62, the control unit 20 confirms whether or not the image signal (image data) acquired in the processing of step S58 in FIG. 11 and recorded in the processing of the aforementioned step S61 is a successful image. Here, as mentioned earlier, a successful image is an image that matches a user's image pickup intention when the user picks up an image of a desired specific image pickup target. Hence, whether or not the image is a successful image is determined according to the intention of the user, by a manual operation of the user. For this reason, in the processing of the step S62, the control unit 20 controls the display unit 43 to display a yes/no selection screen and allows the user to make a selection operation (not shown).

Instead, when a shutter release signal generated in the processing of step S57 in FIG. 11 is automatically generated at a predetermined timing (e.g., timing of appropriate composition) depending on the inference model, all images acquired at this timing may be automatically determined as a successful image.

Here, when the image is determined to be a successful image, the processing proceeds to the next step S63. If the image is determined not to be a successful image (failed image), the processing proceeds to step S69.

In step S63, the control unit 20 performs processing of matching the recorded image data and the inference model.

Next, in step S64, the control unit 20 confirms, as a result of the matching processing of the aforementioned step S63, whether or not the image pickup target included in the recorded image data matches (corresponds to) the image pickup target included in the inference model. Here, if there is no correspondence, the processing proceeds to the next step S65.

Note, however, that if the target goes out of the screen and the user continuously follows or searches for the same target, since the same inference model should preferably be used to search the target, when the user continues to hold the image pickup apparatus even after the target has gone out of the screen (detectable by a change in the image or a signal of an attitude sensor built into the apparatus), the inference engine should not switch from the image for specifying the target to a dictionary for determining a specific target (inference model).

Additionally, when the user is searching for a target in an undecided state for a predetermined time period, switching to the dictionary according to similar determinations is not recommended either. Hence, control is performed in a similar manner.

That is, the above inference engine performs processing of matching between a picture signal indicating the specific target included in the image signal acquired by the image pickup unit and the selected target image dictionary, and does not switch the target image dictionary to another target image dictionary under a predetermined circumstance, even when the specific target does not match.

On the other hand, in the aforementioned step S64, if there is correspondence, the processing proceeds to step S66.

In step S65, the control unit 20 switches the currently set inference model to another inference model prestored in the storage section 31, repeats the matching processing of the aforementioned step S63, and performs weighing processing of step S66. Then, the processing proceeds to step S68.

In step S66, the control unit 20 performs weighing processing on the currently set inference model. With this, the inference model is updated according to the user's use tendency.

Next, in step S67, the control unit 20 performs processing to rearrange the inference models in priority order. Then, the processing proceeds to step S68.

In the processing of step S68, the control unit 20 confirms whether a power off signal is received. Here, if a power off signal is confirmed, the series of processing sequence is terminated (end). If a power off signal is not confirmed, the processing proceeds to step S52 in FIG. 11, and the following steps are repeated (reference numeral "11" in FIGS. 11 and 12).

On the other hand, in the processing of the aforementioned step S62, if the recorded image data is determined to be a failed image and the processing proceeds to step S69, in the step S69, the control unit 20 performs relearning request processing. The relearning request processing is processing of requesting the external equipment 100 to perform relearning processing based on the failed image (latest recorded image data).

In the relearning request processing, the control unit 20 transmits and provides, as request data, various types of information such as additional image data (failed image including image pickup parameter information) necessary for performing relearning processing in the external equipment 100, to the external equipment 100.

When "failed image" is thus acquired, relearning processing may be performed to analyze and grasp the failure pattern (failure tendency) of the user, to update to an inference model including information on setting an image pickup parameter or the like that does not generate a failed image.

As has been described, according to the above modification, when the user performs an image pickup operation by using the image pickup apparatus 1 and acquires a successful image, a corresponding inference model can be updated using the successful image data. Accordingly, an appropriate inference model following the use tendency of a main user (e.g., owner) of the image pickup apparatus 1 can be obtained.

Additionally, by assigning priority levels to the multiple inference models stored in the storage section 31 according to the use frequency of the user, a frequently used inference model can be selected automatically. Hence, since an inference model following the use tendency of the user is preferentially selected, a more convenient image pickup apparatus can be achieved.

Note that procedures of the processing sequences described in the embodiments are changeable as long as the properties are maintained. Hence, in the above processing sequences, orders of the processing steps may be changed, multiple processing steps may be performed concurrently, and the order of processing steps may vary every time a string of processing sequences is performed. That is, in terms of the operation flow of the scope of claims, specification, and drawings, even when the terms "first", "next", and the like are used in the description, it does not mean that the order is essential. Moreover, in the steps configuring the operation flow, parts that do not influence the essence of the invention may be omitted as needed, as a matter of course.

Of the techniques described in the specification, most controls and functions mainly described with reference to flowcharts can be set by a software program, and the aforementioned controls and functions can be achieved by reading and executing the software program on a computer. The software program is electronic data which is entirely or partially stored or recorded as a computer program product previously in a production process, in the aforementioned storage medium, memory or the like, and more specifically, in a portable medium such as a flexible disk, a CD-ROM, and a nonvolatile memory, and a storage medium such as a hard disk and volatile memory. Otherwise, the software program may be distributed or provided at the time of shipping, or through a portable medium or a communication line. Even after shipping of the product, the user may download the software through a communication network or the Internet and install the software into a computer, for example, or may install the software into a computer from a storage medium to perform operation, whereby the image pickup apparatus of the embodiment can be implemented easily.

The parts configured of a program can be appropriately replaced with circuits. Note that parts referred to as "units", "sections", or the like in the examples may be configured of a dedicated circuit or a combination of multiple general-purpose circuits, and if necessary, the parts may be configured by a microcomputer operating according to previously programmed software, a processor such as a CPU, or be combined with a sequencer such as an FPGA. Also, a part of or the overall control may be performed by an external device, and in this case, wired and wireless communication circuits connect the components. Communication may be performed by Bluetooth, Wi-Fi, or a telephone line, or may be performed through USB. An ASIC may be formed by integrating a dedicated circuit, a general-purpose circuit, and a controller. Parts that are positioned by mechanical control are configured of various actuators and connection mechanisms for moving if necessary, and the actuator is operated by a driver circuit. The drive circuit is also controlled by a microcomputer or an ASIC according to a specific program. Such control may be calibrated and adjusted in detail by information outputted by various types of sensors and peripheral circuits.

The present invention is not limited to the above embodiments, and various modifications and application can be made within the gist of the invention, as a matter of course. Moreover, the embodiments include various stages of inventions, and various types of inventions can be extracted depending on the combination of the multiple disclosed components. For example, even when some components are deleted from the overall components indicated in the embodiment, the configuration from which the components are deleted may be extracted as an invention, as long as the objective of the invention can be solved, and the effects of the invention can be obtained. Moreover, components of different embodiments may be combined appropriately. The invention is not limited to a specific embodiment, except for the appended claims.

The present invention is not limited to an image pickup apparatus specializing in an image pickup function (e.g., digital camera and video camera), but is widely applicable to various types of electronic equipment having image pickup functions, such as a mobile phone, a smartphone, an electronic organizer, an electronic dictionary, a personal digital assistant, a personal computer, a tablet type terminal device, a game device, a television receiver, a watch, and a navigation system using GPS (global positioning system).

Moreover, the invention is also applicable to electronic equipment for observation that has a function of acquiring an image by use of an image pickup device, and displaying the acquired image on a display device. Examples of the equipment for observation include a telescope, a binocular, a monocular, and a microscope.

Additionally, the invention is also applicable to industrial or medical equipment for observation such as an endoscope and a microscope, or an image pickup apparatus such as a security camera and an on-board camera.

What is claimed is:

1. An image pickup apparatus comprising:
   an image pickup unit that picks up an image of a specific range and acquires an image signal;
   a storage unit that stores a plurality of target image dictionaries respectively corresponding to a plurality of types of targets;
   an inference processor that determines a type of a specific target on the basis of the image signal acquired by the image pickup unit and the plurality of target image dictionaries stored in the storage unit, and selects one of the target image dictionaries corresponding to the determined type of the specific target from the plurality of target image dictionaries; and
   an image pickup controller that performs image pickup control on the basis of the image signal acquired by the image pickup unit and the target image dictionary selected by the inference processor
   wherein the inference processor performs matching processing between a picture signal indicating the specific target included in the image signal acquired by the image pickup unit and the selected target image dictionary, and sets the image pickup target if the specific target matches, and does not switch the target image dictionary to another target image dictionary for a predetermined time period if the specific target does not match, and
   wherein, after the predetermined time period has elapsed, if the specific target does not match, the inference processor switches the target image dictionary to another target image dictionary.

2. The image pickup apparatus according to claim 1, wherein the image pickup controller includes a parameter control section that sets an image pickup parameter for appropriately picking up an image of a picture signal indicating a specific target included in the image signal.

3. The image pickup apparatus according to claim 1, wherein
   when the specific target matches as a result of the matching processing by the inference processor, the image pickup controller outputs a shutter release signal at a predetermined timing to start an image pickup operation.

4. The image pickup apparatus according to claim 2, wherein
   when the specific target matches as a result of the matching processing by the inference processor, the image pickup controller outputs a shutter release signal at a predetermined timing to start an image pickup operation.

5. The image pickup apparatus according to claim 1, wherein
   the inference processor performs matching processing between the image signal acquired by the image pickup unit and the selected target image dictionary, and if the specific target matches, weighs the target image dictionary to set a usage preference of the target image dictionary.

6. The image pickup apparatus according to claim 2, wherein
   the inference processor performs matching processing between the image signal acquired by the image pickup unit and the selected target image dictionary, and if the specific target matches, weighs the target image dictionary to set a usage preference of the target image dictionary.

7. An image pickup method comprising steps of:
   picking up an image of a specific range and acquiring an image signal;
   determining a type of a specific target by performing matching processing between the image signal and a plurality of target image dictionaries respectively corresponding to a plurality of types of targets;
   selecting one of the target image dictionaries corresponding to the determined type of the specific target;
   setting an image pickup parameter for appropriately picking up an image of a picture signal indicating a specific target included in the image signal, on the basis of the image signal and the target image dictionary selected from among the plurality of target image dictionaries; and outputting a shutter release signal at a predetermined timing to start an image pickup operation,
   wherein the selecting of the one of the target image dictionaries includes performing the matching processing and setting the image pickup target if the specific target matches, and in the selecting, the target image dictionary is not switched to another target image dictionary for a predetermined time period of the specific target does not match, and
   wherein the selecting of the one of the target image dictionaries includes, after the predetermined time period has elapsed, if the specific target does not match, switching the target image dictionary to another target image dictionary.

* * * * *